United States Patent [19]
Kamachi et al.

[11] Patent Number: 5,187,226
[45] Date of Patent: Feb. 16, 1993

[54] VINYL ALCOHOL POLYMER

[75] Inventors: Mikiharu Kamachi, Toyonaka; Tohei Yamamoto, Hyogo; Toshiaki Sato; Yoshiharu Fukunishi, both of Kurashiki, all of Japan

[73] Assignee: Kuraray Co., Ltd., Kurashiki, Japan

[21] Appl. No.: 488,876

[22] Filed: Mar. 6, 1990

[30] Foreign Application Priority Data

Mar. 7, 1989 [JP] Japan .................................. 1-55799
Aug. 7, 1989 [JP] Japan ................................ 1-205509

[51] Int. Cl.$^5$ ............................................. C08F 16/06
[52] U.S. Cl. .................................... 525/56; 525/60; 525/62; 525/330.5; 525/330.6
[58] Field of Search ............... 525/56, 60, 62, 330.5, 525/330.6

[56] References Cited

U.S. PATENT DOCUMENTS

| | | | |
|---|---|---|---|
| 2,850,489 | 9/1958 | Turnbull | 525/62 |
| 2,862,916 | 12/1958 | Luhman | 525/62 |
| 3,033,843 | 5/1962 | Inskip et al. | 525/62 |
| 3,141,003 | 7/1964 | Neros et al. | 525/62 X |
| 3,193,542 | 7/1965 | Imai | 525/62 |
| 3,222,338 | 12/1965 | Fujii et al. | 525/62 |
| 3,238,283 | 3/1966 | Fujii et al. | 525/62 X |
| 3,269,995 | 8/1966 | Fujii | 525/62 X |
| 3,329,754 | 7/1967 | Black | 525/62 X |
| 3,427,298 | 2/1969 | Tsuboi et al. | 525/62 X |
| 3,513,142 | 5/1970 | Blumberg et al. | 525/62 |
| 3,548,031 | 12/1970 | Oyonagi et al. | 525/62 X |
| 3,697,495 | 10/1972 | Bristol | 525/62 X |
| 3,965,081 | 6/1976 | Strecker et al. | 525/62 X |
| 3,985,719 | 10/1976 | Hoyt et al. | 525/62 |
| 4,003,810 | 1/1977 | Hoyt et al. | 525/62 X |
| 4,200,709 | 4/1980 | Hoyt | 525/62 |
| 4,820,767 | 4/1989 | Wu | 525/62 |

FOREIGN PATENT DOCUMENTS 1165486 10/1969 United Kingdom ................ 525/60

Primary Examiner—Joseph L. Schofer
Assistant Examiner—J. M. Reddick
Attorney, Agent, or Firm—Oblon, Spivak, McClelland, Maier & Neustadt

[57] ABSTRACT

Vinyl alcohol polymers having a high syndiotacticity and a high degree of polymerization. They are useful as water-resistant films, heat-resistant films, material for high-strength gel and as paper processing agents.

5 Claims, 1 Drawing Sheet

VINYL ALCOHOL POLYMER

BACKGROUND OF THE INVENTION

1. Field of the Invention

The present invention relates to a vinyl alcohol polymer and a process for producing the same. In particular, it relates to a vinyl alcohol polymer having a high syndiotacticity and a high degree of polymerization which contains a vinyl alcohol unit and a vinyl ester unit, and also to a process for producing the same.

2. Description of the Prior Art

Polyvinyl alcohol, i.e., hydrolyzed product of polyvinyl acetate is one of the crystalline water-soluble polymers limited in number, and has excellent interfacial characteristics and mechanical properties, which fact leads to such uses as paper processing, stabilizers for emulsions and the like. In addition, it is widely known that they are used as raw materials for polyvinyl alcohol films and the like. Recently, the uses thereof in new fields such as raw materials for gels have positively been developed.

Polyvinyl alcohols commercially available heretofore are stereospecifically so-called "atactic" and have a diad syndiotacticity of about 53 mol %. As is commonly known, a polyvinyl alcohol with excellent stereoregularity has physical properties significantly different from those of atactic polymers due to hydrogen bond, and especially the polyvinyl alcohol having a diad syndiotacticity of at least 55 mol % becomes easy to crystallize, which can make the usefulness of the polyvinyl alcohol increase. For the purpose of obtaining a polyvinyl alcohol with a high syndiotacticity, there are proposed several processes, among which a process comprising the hydrolysis of polyvinyl pivalate can be mentioned. For example, Sakaguchi et al. reported that a polyvinyl alcohol was obtained by hydrolyzing polyvinyl pivalate in a mixed solvent of acetone and water in the presence of potassium hydroxide (cf. Kobunshi Kagaku, 27, 758-762 (1970)). Nozakura et al. reported that a polyvinyl alcohol was obtained by hydrolyzing polyvinyl pivalate in a mixed solvent of either acetone and methanol or dioxane and methanol, followed by the hydrolysis thereof in methanol in the presence of potassium hydroxide (cf. Journal of Polymer Science: Polymer Chemistry Edition, 11, 279-288 (1973)). Furthermore, Imai et al. reported that a polyvinyl alcohol was obtained by hydrolyzing polyvinyl pivalate in acetone and then in dimethyl sulfoxide in the presence of potassium hydroxide (cf. Journal of Polymer Science: Polymer Chemistry Edition, 26, 1961-1968 (1988)).

However, in general, since such a polyvinyl ester having a bulky side chain as polyvinyl pivalate is difficult to be hydrolyized due to its steric hindrance, highly hydrolyzed polyvinyl alcohol cannot be obtained under the conditions as applied conventionally to polyvinyl acetate. For example, according to the above-mentioned paper of Sakaguchi et al., the degree of hydrolysis of the obtained polyvinyl alcohol is confined below about 52%. On the other hand, according to the above-described paper of Nozakura et al., the degree of hydrolysis and the degree of polymerization of the obtained polyvinyl alcohol are unknown. The present inventors therefore made the supplementary test according to the process shown by Nozakura et al., and found that polyvinyl pivalate was hydrolyzed to give a polyvinyl alcohol having a rather high degree of hydrolysis, which colored dark brown and degraded. Moreover, this process is troublesome to conduct due to the need of repeated hydrolysis. Besides, according to the above paper of Imai et al., the obtained polyvinyl alcohol had a low degree of polymerization, which fact suggests that the degree of polymerization had decreased during the hydrolysis. To make matters worse, the process reported by Imai et al. is also troublesome to conduct due to the two-stage hydrolysis.

SUMMARY OF THE INVENTION

An object of the present invention is to provide a novel vinyl alcohol polymer having a high syndiotacticity and a high degree of polymerization.

Another object of the present invention is to provide a process for producing a vinyl alcohol polymer having a high syndiotacticity and a high degree of polymerization while preventing the degree of polymerization from practical lowering during the hydrolysis.

A further object of the present invention is to provide a vinyl alcohol polymer film, obtained from the above vinyl alcohol polymer, having a high syndiotacticity and a high degree of polymerization, the film being excellent in strength, heat resistance, water resistance, wet heat resistance, and durability.

A still further object of the present invention is to provide a gel comprising the above vinyl alcohol polymer, which is excellent in water resistance, heat resistance, durability and strength.

For an example of embodiments, the present invention provides a vinyl alcohol polymer having a vinyl alcohol unit of 10 to 99.99 mol %, a vinyl pivalate unit of 90 to 0.01 mol %, a syndiotacticity of not less than 55 mol % and an intrinsic viscosity of not less than 0.70 dl/g.

For another example of embodiments, the present invention provides a process for producing a vinyl alcohol polymer without decreasing the degree of polymerization during hydrolysis in the substantial absence of oxygen or in the presence of an antioxidant.

DETAILED DESCRIPTION OF THE INVENTION

Figure 1:
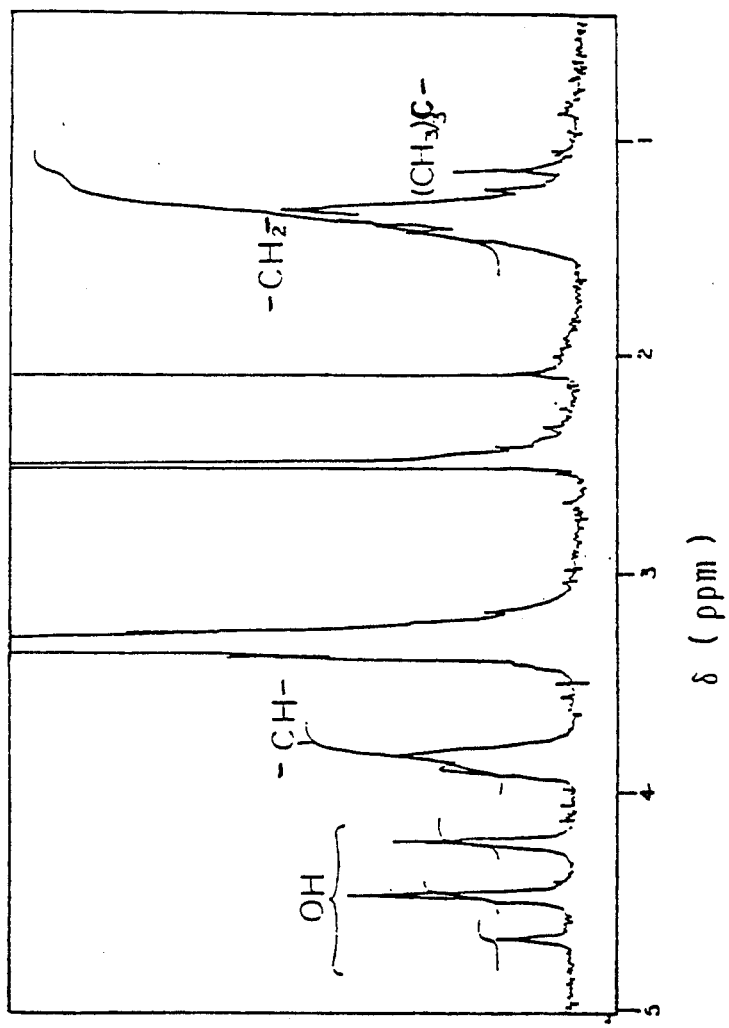

The present invention provides a vinyl alcohol polymer containing the constituent unit (I) and the constituent unit (II) represented by the following formulae, having a content of the constituent unit (I) of 10 to 99.99 mol % and a content of the constituent unit (II) of 90 to 0.01 mol %, a diad syndiotacticity of not less than 55 mol % and an intrinsic viscosity of polyvinyl acetate obtained by acetylation of 0.7 dl/g, which is measured in benzene at 30° C.

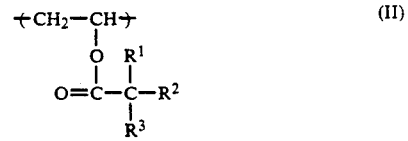

wherein $R^1$ is a hydrogen atom or a hydrocarbon group and each of $R^2$ and $R^3$ is a hydrocarbon group.

The above polymer contains as essential constituent units vinyl alcohol unit represented by the formula (I) and vinyl ester unit represented by the formula (II), the content of vinyl alcohol unit (I) being 10 to 99.99 mol % and the content of vinyl ester unit (II) being 90 to 0.01 mol %. The content of vinyl alcohol unit is not substantially more than 99.99 mol %. The polymer containing the vinyl alcohol unit of more than 99.99 mol % is extremely difficult to be industrially produced. On the other hand, the polymer containing the vinyl alcohol unit of less than 10 mol % may not have enough intermolecular force which is one of the characteristics thereof.

The content of vinyl alcohol unit of the polymer is appropriately selected in terms of its use as follows. The polymer having a vinyl alcohol unit of 10 to 55 mol % is mainly used for the uses where low crystallinity is preferred. On the other hand, the polymer having a vinyl alcohol unit of 55 to 99.99 mol %, preferably 90 to 99.99 mol %, is mainly used for the uses where high crystallinity is preferred. And the polymer having a vinyl alcohol unit of 96 to 99.99 mol %, preferably 97 to 99.99 mol %, is very suitable for the above uses.

Preferred examples of hydrocarbon groups represented by $R^1$, $R^2$ and $R^3$ in the formula (II) are ones having 1 to 18 carbon atoms such as lower alkyl groups, e.g., methyl, ethyl, propyl and butyl; an aryl group, e.g., phenyl; and a cycloalkyl group, e.g., cyclohexyl. Each of $R^1$, $R^2$ and $R^3$ is preferably a methyl group in consideration of the general-purpose usefulness of the vinyl ester represented by the following formula (III) which corresponds to the vinyl-ester-unit-donating monomer:

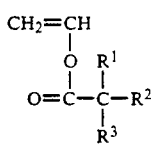

(III)

wherein $R^1$, $R^2$ and $R^3$ are the same as defined above. The vinyl alcohol polymer of the present invention has a content of vinyl alcohol unit of 10 to 99.99 mol % and a content of vinyl ester unit of 90 to 0.01 mol % and may further contain an ethylene unit which may be substituted. Examples of monomers which correspond to these ethylene units which may be substituted are as follows: vinyl esters except the vinyl esters represented by the formula (III), such as vinyl formate, vinyl acetate, vinyl propionate, vinyl valerate, vinyl caprate and vinyl laurate; olefins, such as ethylene, propylene, isobutylene, α-octene, α-dodecene and α-octadecene; α,β-unsaturated carboxylic acids, such as acrylic acid, methacrylic acid, crotonic acid, maleic anhydride and itaconic acid, or salts, monoalkyl esters or dialkyl esters thereof; α,β-unsaturated nitriles, such as acrylonitrile and methacrylonitrile; unsaturated amides, such as acrylic amide, methacrylic amide and N-vinylpyrrolidone; olefinsulfonic acids, such as ethylenesulfonic acid, allylsulfonic acid and methallylsulfonic acid, or salts thereof; alkyl vinyl ethers such as isopropyl vinyl ether; polyoxyalkylene alkylallyl ethers such as polyoxyethylene methyl allyl ether; alkyl allyl ethers such as isopropyl allyl ether; saturated allyl carboxylate esters such as allyl acetate; vinyl ketones such as methyl vinyl ketone; halogenated olefins such as vinyl chloride and vinylidene chloride; and monomers containing amino group or quaternary ammonium group, such as 1-vinyl-2-methyl imidazole and 1-vinyl-2,3-dimethyl imidazolinium chloride. The content of these ethylene units which may be substituted is generally not more than 5 mol %.

In the present invention, the degree of polymerization of the vinyl alcohol polymer is expressed by the value of the intrinsic viscosity, [η], measured in benzene at 30° C., of the vinyl acetate polymer obtained by the acetylation thereof. The intrinsic viscosity of the vinyl acetate polymer of the present invention, measured by the above method, is not less than 0.70 dl/g, preferably not less than 1.0 dl/g, more preferably not less than 1.5 dl/g, more preferably not less than 2.0 dl/g, and more preferably not less than 2.5 dl/g.

In this case the gel prepared from the vinyl alcohol polymer has high mechanical strength. However, the upper limit of the above-described intrinsic viscosity of the vinyl alcohol polymer is preferably 15.0 dl/g since the processability thereof becomes difficult in case that the intrinsic viscosity is too high.

The diad syndiotacticity of the vinyl alcohol polymer of the present invention is not less than 55 mol %, preferably not less than 57 mol %. In case that the diad syndiotacticity thereof is not less than 55 mol %, the above polymer is easy to crystallize and is hence capable of forming a gel with a high melting point.

The diad syndiotacticity (s) as referred to in the present invention is calculated from the triad syndiotacticity determined by the proton NMR spectrometry of the vinyl alcohol polymer dissolved in $d_6$-DMSO (cf. T. Moritani et al., Macromolecules, 5, 577 (1972)), syndiotacticity (S), heterotacticity (H) and isotacticity (I) as:

$s = S + H/2$ (diad syndiotacticity)

$i = I + H/2$ (diad isotacticity).

Among the vinyl alcohol polymers of the present invention, that having a 1,2-glycol content of 1.8 to 5 mol % are excellent in solubility and processability.

In the substantial absence of oxygen or in the presence of an antioxidant, the vinyl alcohol polymer of the present invention containing vinyl alcohol unit represented by the formula (I) and a vinyl ester unit represented by the formula (II) can be produced, without a significant decrease in the degree of polymerization during the hydrolysis, by the hydrolysis of the homopolymer of copolymer of a vinyl ester represented by the formula (III).

Hereinafter, the process for producing the vinyl alcohol polymer of the present invention is described in more detail.

In the formula (III) representing the vinyl ester used in the process of the present invention, preferred examples of the hydrocarbon groups represented by $R^1$, $R^2$ and $R^3$ are as follows: hydrocarbon groups having 1 to 18 carbon atoms, e.g., lower alkyl groups such as methyl, ethyl, propyl and butyl; aryl groups such as phenyl; and cycloalkyl groups such as cyclohexyl. Each of $R^1$, $R^2$ and $R^3$ is preferably a methyl group in view of the availability of the vinyl ester. Namely, the most preferred example of the vinyl ester is vinyl pivalate and vinyl versatate is also used. There are two types of the comonomers capable of forming the copolymer of the vinyl ester represented by the formula (III). The first type of comonomers are those which generate vinyl alcohol units by hydrolysis and the second type of comonomers are those except the first type. The first type of comonomers is used to control the tacticity and the second type is used to change the property of vinyl alcohol polymer. The examples of the former type are vinyl esters such as: vinyl acetate, vinyl formate, vinyl propionate, vinyl valerate, vinyl pivalate, vinyl versatate, vinyl laurate vinyl stearate, and vinyl benzoate. On the other hand, the examples of the latter type are such compounds as: olefins such as ethylene, propylene, 1-butene and isobutene; acrylic acid and its salts; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and its salts; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, N-methylacrylamide, N-ethylacrylamide, N,N-dimethylacrylamide, diacetoneacrylamide, and acrylamide propanesulfonic acid and its salts; acrylamide propyldimethylamine and its salts and quarternary salts; methacrylamide derivatives such as N-methylolacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; vinyl halides such as vinyl chlorides, vinylidene chloride, vinyl fluoride, and vinylidene fluoride; allylic compounds such as allyl acetate and allyl chloride; maleic acid and its salts and esters; itaconic acid and its salts and esters; vinyl silyl compounds such as vinyltrimethoxysilane; isopropenyl acetate and the like. In order to obtain such a highly syndiotactic vinyl alcohol polymer as the above-described polymer of the present invention, the polymer to be subjected to the hydrolysis is preferably the homopolymer represented by the formula (III) or the copolymer obtained by the copolymerization of the vinyl ester represented by the formula (III) with a comonomer in a ratio to total monomer of generally, though depending upon the type of the comonomer used, not less than 55 mol %. The homopolymer and copolymer of the vinyl ester represented by the formula (III) are produced by the homopolymerization of the above vinyl ester and the copolymerization of the above vinyl ester with a comonomer according to a conventional process such as bulk polymerization, solution polymerization, suspension polymerization, and emulsion polymerization.

There is no limitation concerning the polymerization temperature of the vinyl esters, and it is appropriately selected from the range of from −80° to 300° C. In case that the polymerization temperature is in the range of from 70° to 200° C., the polyvinyl alcohol polymer obtained has a 1,2-glycol content of not less than 1.8 mol % and a syndiotacticity of not less than 55 mol %. At a polymerization temperature below 70° C., the 1,2-glycol content is less than 1.8 mol %. Furthermore, at a polymerization temperature exceeding 300° C., the syndiotacticity is less than 55 mol %. The 1,2-glycol content can be controlled by the copolymerization of vinylene carbonate.

The hydrolysis according to the present invention is performed in the presence of an alkali. Either ester exchange reaction or direct hydrolysis reaction can be selected, depending upon the amount of the above alkali used or the kind of solvent used. Examples of the alkali are as follows: alkali metal hydroxides such as potassium hydroxide, sodium hydroxide and lithium hydroxide; and alkali metal alcoholates such as sodium methoxide, sodium ethoxide, potassium methoxide, potassium ethoxide and potassium t-butoxide. By using these alkalis, hydrolysis is performed as follows. In the substantial absence of oxygen or in the presence of an antioxidant, the homopolymer or copolymer of the vinyl ester represented by the formula (III) is hydrolyzed with the above-described alkali in a solvent capable of dissolving or fully swelling the above homopolymer or copolymer.

Any solvent can be used for the above hydrolysis as long as it can dissolve or swell the homopolymer or copolymer of the vinyl ester represented by the formula (III), but preferably used are those having a large solubility on the alkali and capable of swelling or dissolving the vinyl alcohol polymer formed. Examples of such solvents are as follows: cyclic ethers such as tetrahydrofuran and dioxane; ketones such as acetone, methyl ethyl ketone, methyl isobutyl ketone and pinacolin; sulfoxides such as dimethyl sulfoxide; hydrocarbons such as toluene, benzene, n-hexane and cyclohexane; and alcohols such as methanol, ethanol, isopropyl alcohol, n-propyl alcohol, n-butanol, isobutanol, sec-butanol, t-butanol, amyl alcohol and cyclohexanol. These solvents are utilized singly or as admixture. Among them more preferably used are methyl ethyl ketone, tetrahydrofuran, dioxane, t-butanol and methanol. These solvents can contain a small quantity of water.

As a process for realizing the substantial absence of oxygen in the hydrolysis, there can generally be employed a process which comprises introducing into the reaction system and bubbling therein an inert gas such as nitrogen gas or argon gas which has been deoxygenated. However, since there is no limitation concerning the means and methods for the deoxygenation in the production processes of the present invention, the substantial absence of oxygen in the reaction system can also be realized by incorporating therein an oxygen adsorbent that will not exert harmful influences upon the system. In the hydrolysis, the dissolved oxygen concentration in the reaction mixture containing polymer in the form of a polymer solution, a polymer swelled with a solvent or a polymer dispersion is preferably not more than $5 \times 10^{-4}$ mole/l as determined according to Winkler's method. Where hydrolysis is performed in the substantial presence of oxygen, the degree of polymerization of the homopolymer or copolymer of a vinyl ester decreases significantly unless an antioxidant is incorporated into the reaction system, and hence a vinyl alcohol polymer having a high degree of hydrolysis and a high degree of polymerization is difficult to be obtained.

Any antioxidant may be used in the processes of the present invention insofar as it does not exert harmful influences upon the hydrolysis and does not lose its activity against the oxidation of the reaction system. Examples of such antioxidants are hindered phenol antioxidants such as a compound represented by the following formula (IRGANOX 1010, commercially available from Nippon Ciba-Geigy):

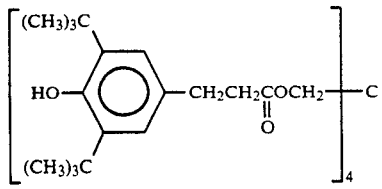

and a compound represented by the following formula (IRGANOX 1098, commercially available from Nippon Ciba-Geigy):

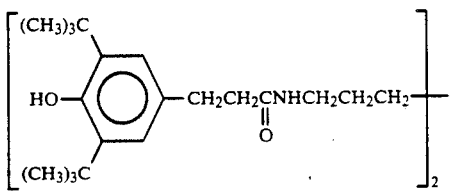

phenol antioxidants such as hydroquinone and hindered amine antioxidants such as SANOL LS-770 (commercially available from Nippon Ciba-Geigy). These antioxidants can be used singly or as admixture of two or more. The incorporation of an antioxidant, without any special deoxygenating operation, does not decrease the degree of polymerization of the homopolymer or copolymer of a vinyl ester during the hydrolysis. In case that an antioxidant is employed, a smaller amount of the antioxidant can bring about the above-described effect if a part of oxygen in the system would be removed from the system by the afore-mentioned process.

The concentration of the polymer such as the homopolymer or copolymer of the vinyl ester represented by the formula (III) and the vinyl alcohol polymer derived therefrom in the reaction mixture containing polymer in the hydrolysis can be appropriately selected, depending upon the degree of polymerization of the homopolymer or copolymer of the vinyl ester represented by the formula (III). It is generally set up in the range between 1 wt % and 70 wt %. The amount of an alkali to be added to the reaction system is represented by the molar ratio of the alkali units to the total vinyl ester units which is inclusive of the vinyl ester units represented by the formula (II) originating from the vinyl ester represented by the formula (III) and the vinyl ester units, used occasionally as a comonomer, originating from a vinyl ester except the vinyl ester represented by the formula (III). The ratio is generally set up in the range between 0.005 and 10. These upper and lower limits are variable, depending upon the desired degree of hydrolysis and the types of solvent and alkali to be utilized. In general, in case that the ratio is less than 0.005, the degree of hydrolysis does not significantly increase. On the other hand, the ratio exceeding 10 accelerates the hydrolysis without any troubles but easily causes the degree of polymerization to decrease. The incorporation amount of the alkali is set up to compensate the amount of alkali in case that the copolymer of the vinyl ester represented by the formula (III) contains a group capable of reacting with the alkali, e.g., a carboxyl group in the monomer units except the total vinyl ester units and in another case that the antioxidant reacts with the alkali. The temperature of the hydrolysis is generally set up in the range between 20° C. and 150° C. At a higher temperature exceedng 150° C., the degree of polymerization readily decreases. The time of the hydrolysis is appropriately selected, depending upon the desired degree of hydrolysis, the solvent and alkali employed in the hydrolysis, the molar ratio of the alkali to the total vinyl ester units, and the reaction temperature. After the completion of the hydrolysis, it is preferred that the remaining alkali is neutralized with an acid. Examples of the acids are inorganic acids such as hydrochloric acid, sulfuric acid, nitric acid, phosphoric acid and carbonic acid or organic acids such as formic acid, acetic acid and benzoic acid, among which preferred are organic acids. Among the organic acids, most preferred is acetic acid. In case that the remaining alkali is not neutralized just after the completion of the hydrolysis, the degree of polymerization of the thus-obtained vinyl alcohol polymer decreases, which is not preferred. Furthermore, unnecessary heating after the completion of the hydrolysis causes the polymer to color yellow or dark brown and a decrease of the degree of polymerization, which is to be averted.

The vinyl alcohol polymer thus obtained is then purified by conventional methods, for example, the neutralization of the remaining alkali and the subsequent washing.

As explained in detail heretofore, according to the present invention, there can be easily produced a vinyl alcohol polymer having a high syndiotacticity and a high degree of polymerization without a decrease of the degree of polymerization.

The vinyl alcohol polymer of the present invention is characterized by its high syndiotacticity and meager branching, namely, high linearity.

According to another embodiment of the present invention, introduction of 1,2-glycol structure into a highly syndiotactic vinyl alcohol polymer contributes, while disturbing the crystallization of the polymer, to the formation of intermolecular hydrogen bonds in the amorphous region thereof, which cannot be realized by copolymerization method or partial hydrolysis method. As a result, in addition to the above-described high syndiotacticity, the polymer will acquire good processability and hence is used not only in the known fields of the polyvinyl alcohol but also in such fields where the highly syndiotactic polyvinyl alcohol is preferred but is difficult to apply due to its poor processability.

Examples of the uses of the vinyl alcohol polymer of the present invention are as follows: water-resistant film, heat-resistant film, material for high-strength gel, paper-processing agent and the like. Thus the vinyl alcohol polymer is highly valuable in the industrial fields. Hereinafter the concrete uses of the above polymer are described in detail.

FILM

Since polyvinyl alcohol films are excellent in mechanical properties, transparency, oxygen-barrier property, electrical insulating property at low temperatures, oil resistance and the like, they are positively utilized in forms of film, membrane and sheet as packaging material for fibrous product, gas barrier material, membrane filter of variouus types, separating membrane, electrical insulating material, optical film such as base material for light-polarizing film and material for oil-resistant belt.

However, in recent years, there has been required the maintenance of performance in the above-described uses under severer conditions than ever, particularly under high temperatures and high humidities. As a result, at present a film made from a conventional polyvinyl alcohol, which is inferior in water resistance and heat resistance, particularly when having absorbed moisture, cannot cope with the above requirement.

In these circumstances, the present invention provides a film comprising a novel vinyl alcohol polymer not only having characteristics of a conventional polyvinyl alcohol such as high strength, transparency and oil resistance but also being excellent in heat resistance, water resistance and wet heat resistance.

The present inventors had intensively studied in order to solve the above problems and as a result found that the above object can be accomplished by a film comprising a vinyl alcohol polymer having a syndiotacticity of not less than 55 mol % and a vinyl pivalate unit.

A polyvinyl alcohol employed for a conventional polyvinyl alcohol film is so-called "atactic" and has a syndiotacticity of about 53 mol %. On the other hand, the vinyl alcohol polymer film of the present invention is a film comprising a vinyl alcohol polymer having a syndiotacticity of not less than 55 mol % which is a hydrolyzed product of the homopolymer or copolymer of vinyl pivalate. Therefore, the above film is characterized by its high strength and water resistance which are considered to originate from the improved crystallinity derived from its high syndiotacticity and from the residual group being hydrophobic vinyl pivalate unit.

Hereinafter, the film of the present invention is described in more detail.

The vinyl alcohol polymer forming the film of the present invention has a syndiotacticity of not less 55 mol %. The increase in a syndiotacticity thereof results in the improvement of strength, water resistance and heat resistance, and hence for the purpose of achieving the effect of the present invention it is necessary that the above polymer have a syndiotacticity of not less than 55 mol %, preferably not less than 57 mol %. Since too high a syndiotacticity will cause some troubles during the film-forming step and some difficulties in the production of the above vinyl alcohol polymer itself, it is preferred that the syndiotacticity thereof be not more than 70 mol %.

The degree of hydrolysis of the vinyl alcohol polymer is not less than 10 mol %, preferably not less than 60 mol %, and in case that heat resistance, water resistance and oil resistance are particularly required, the degree of hydrolysis thereof is preferably 90 to 99.99 mol %. In this case, the degree of hydrolysis represents the ratio of the vinyl alcohol units after the completion of the hydrolysis to the units capable of being changed to vinyl alcohol units by the hydrolysis of the homopolymer or copolymer of vinyl pivalate, and hence the residual group is vinyl pivalate unit.

The intrinsic viscosity of the vinyl alcohol polymer influences the performance of the film of the present invention. The intrinsic viscosity to be achieved is selected appropriately in view of the use of the film obtained. Judging from the film strength and the processing characteristics, it is not less than 0.40 dl/g, preferably not less than 0.70 dl/g, more preferably not less than 1.00 dl/g. Furthermore, it is preferably not more than 5.00 dl/g judging from the processability of the polymer obtained such as film formation and drawing.

The film comprising the vinyl alcohol polymer of the present invention has no particular restrictions as to the thickness, shape and transparency, and is generically named as "film", "membrane" or "sheet".

There is also no further particular limitation concerning the process for producing a vinyl alcohol polymer film from the above-described vinyl alcohol polymer in the present invention, and the process is appropriately selected in view of the required thickness, uses and objects of the film. Generally mentioned are film formation from polymer solution by casting process, dry process which comprises extruding into air or an inert gas such as nitrogen, wet process which comprises extruding the vinyl alcohol polymer into a poor solvent, dry wet process, and the like. Examples of the solvent used singly or as admixture are dimethyl sulfoxide, dimethyl formamide, dimethyl acetoamide, ethylene glycol, glycerin, water, hexafluoro isopropanol and the like. Aqueous solutions of inorganic salts such as lithium chloride and calcium chloride can also be used singly or as admixtures with the above-described organic solvents. Among the above, water, dimethyl sulfoxide, a mixture of dimethyl sulfoxide and water, glycerin and ethylene glycol are preferably used. The concentration of a vinyl alcohol polymer at the time of forming a film is generally 1 to 50 wt %, depending upon the process employed, and the temperature of formation is generally in the range of from room temperature to 250° C.

The vinyl alcohol polymer film of the present invention may contain other compounds as long as they do not injure the objects of the present invention. Examples of such compounds are conventional polyvinyl alcohols or the other polymers, plasticizers such as glycerin, inorganic compounds such as clay, silica and calcium carbonate, and the like. Furthermore, as occasion demands, dyestuffs or pigments for coloring and stabilizers such as antioxidants and ultraviolet absorbents can be incorporated into the above film.

In particular, the film formed from the vinyl alcohol polymer of the present invention is more excellent in strength, water resistance and heat resistance than that formed from a conventional polyvinyl alcohol. This fact was achieved for the first time by using a vinyl alcohol polymer having a syndiotacticity of not less than 55 mol % which is a hydrolyzed product of the homopolymer or copolymer of vinyl pivalate.

With the best use of the above characteristics, the vinyl alcohol polymer film obtained in the present invention is used in such fields as various sorts of packaging materials, gas barrier materials, optical films such as base materials for light-polarizing films and for filters, and various sorts of separation membranes, and is thus of a high industrial value.

GEL

Gels, particularly polymer containing water as a swelling component are known and have found their application in daily lives of mankind. Most of all, various natural gels were at first used in foodstuffs.

Then there have been developed highly water-absorbing gels such as those used for diapers and sanitary napkins, gels for immobilizing enzymes and biomasses, gels having an affinity for living bodies such as contact lenses, artificial muscles and artificial organs, and the like.

Developments in fundamental science on gels represented by the discovery of phase transition phenomenon in gels suggest the possibilities of functional gels as one of advanced techniques, such as sensors, functional separating membranes, release-controlling films, switches, and actuators.

On the other hand, polymers as base material for gels are classified into two groups: one group being natural polymers such as gelatin and various saccharides; and another one being synthetic polymers such as polyacrylic acid, 2-hydroxyethyl polymethacrylate and polyvinyl alcohol. In these days, in many cases, new uses of gels often demand high strength, high water resistance, high heat resistance and high durability. Therefore, development of new base materials for gels which can cope with the above-mentioned requirements is strongly desired.

In these circumstances, the present invention provides a gel with excellent water resistance, heat resistance, durability, and strength.

The present inventors had intensively studied in order to solve the above problems and as a result found that the above object can be accomplished by a gel comprising a vinyl alcohol polymer having a syndiotacticity of not less than 55 mol %.

Vinyl alcohol polymers have been used as gels in view of their high strength. A conventional polyvinyl alcohol is what is known as "atactic" and has a syndiotacticity of about 53 mol %. The gel of the present invention comprises a vinyl alcohol polymer having a syndiotacticity of not less than 55 mol %. The gel comprising the above polymer has a higher syndiotacticity than that of a gel comprising a conventional polyvinyl alcohol. Then, the gel comprising the vinyl alcohol polymer of the present invention is characterized by its high water resistance, high heat resistance, high durability, and high strength.

Hereinafter, the present invention is described in more detail.

The gel of the present invention is characterized in that it comprises a vinyl alcohol polymer having a higher syndiotacticity than that of a conventional polyvinyl alcohol. For the purpose of producing the effect by the increase of syndiotacticity, it is necessary that the polymer has a syndiotacticity of not less than 55 mol %, preferably not less than 57 mol %. With increasing syndiotacticity of a vinyl alcohol polymer, the polymer will be improved in its strength, melting point, water resistance, and heat resistance. Since too high a syndiotacticity will cause some troubles during the gel-producing step and also some difficulties in the production of the vinyl alcohol polymer itself, it is preferred that the syndiotacticity be not more than 75 mol %.

The intrinsic viscosity and the degree of hydrolysis of the vinyl alcohol polymer also influence the performance of the gel obtained. The intrinsic viscosity is not less than 0.30 dl/g, preferably not less than 1.00 dl/g judging from the strength and processability of the gel. Judging from the processability, it is preferably not more than 8.00 dl/g. The degree of hydrolysis is not less than 70 mol %, preferably not less than 80 mol %.

The gel as referred to in the present invention is a general term for a polymer containing water or organic solvents, which is crosslinked chemically or physically. The gels of the present invention are preferably used for gels containing water or organic solvents such as dimethyl sulfoxide, dimethylformamide, dimethylacetoamide, glycerin, ethylene glycol, and diethylene glycol. The gels of the present invention are prepared according to various processes as mentioned below: a process which comprises first forming a vinyl alcohol polymer into a sheet or spheres, and then crosslinking the vinyl alcohol polymer by radiation or with a peroxide; a process which comprises gelling by freezing a solution of the polymer or the polymer swelled with a solvent, including repeated freezing and melting; a process which comprises forming, by suspension polymerization or precipitation polymerization, granules of a precursor of the vinyl alcohol polymer of the present invention such as polyvinyl pivalate and then hydrolyzing the precursor, and the like.

The gel of the present invention can be used singly, or as admixtures of the other polymers such as a conventional polyvinyl alcohol within the extent of not to impair the purpose of the present invention.

According to the present invention, gels can be obtained which are more excellent in strength, water resistance and heat resistance than those made from conventional polyvinyl alcohols. Furthermore, the gels of the present invention are extremely useful as base material for high-solvent-content gels. This was achieved for the first time by using a vinyl alcohol polymer having a syndiotacticity of not less than 55 mol %.

With the best use of the above-described characteristics, gels obtained in the present invention are used for immobilizing enzymes and biomasses, for gels having an affinity for living bodies, such as contact lenses, artificial muscles and artificial organs, functional gels such as sensors, functional separating membranes, release-controlling films, switches, and actuators, and the like.

PROCESS FOR PRODUCING SHAPED ARTICLE

Shaped articles such as films have been formed according to dry coagulation process, wet coagulation process, dry wet coagulation process or gel coagulation process. These formation processes are appropriately selected in view of the uses and objects of obtained shaped articles. Among the above there have been preferably employed highly productive wet cogulation process, dry wet coagulation process and gel coagulation process.

Conventional polyvinyl alcohols are atactic and have a syndiotacticity of about 53 mol %. Therefore, in case that these polyvinyl alcohols are formed into shaped articles by wet coagulation or dry wet coagulation, the solutions of the polyvinyl alcohols must be extruded into organic solvents, aqueous solutions of inorganic salts or aqueous solutions of inorganic bases. However, a process which comprises using, as coagulation solvent, an organic solvent is of high cost and in danger of a fire. Furthermore, a process which comprises using an aqueous solution of inorganic salts or inorganic bases has various problems such as difficulty in operability, corrosion of apparatuses used, poor heat resistance and poor durability, and coloring of obtained shaped articles caused by remaining inorganic salts or inorganic bases.

In these circumstances, the object of the present invention is to provide a process for producing, from a vinyl alcohol polymer having a high syndiotacticity, shaped articles having excellent heat resistance and durability, at a low cost and with high safety without any problems such as low operability and corrosion of apparatuses.

The present inventors had intensively studied in order to solve the above problems and as a result found that the above object can be accomplished by a process for producing shaped articles which comprises contacting a solution comprising a vinyl alcohol polymer having a syndiotacticity of not less than 55 mol % with an aqueous solution containing less than 50 wt % of an organic solvent or with water.

Hereinafter, the present invention is described in more detail.

The vinyl alcohol polymer in the present invention has a syndiotacticity of not less than 55 mol %. With increasing syndiotacticity, the strength, water resistance and heat resistance of the shaped article obtained. For the purpose of producing the effect of the present invention, it is necessary that the vinyl alcohol polymer have a syndiotacticity of not less than 55 mol %, preferably not less than 57 mol %, more preferably not less than 60 mol %.

The degree of hydrolysis of the vinyl alcohol polymer in the present invention is not particularly limited and selected from the range between 10 and 99.99 mol %. In particular, in case that the shaped article obtained is required to be excellent in heat resistance, water resistance and oil resistance, the degree of hydrolysis is preferably 70 to 99.99 mol %. The degree of hydrolysis of a vinyl alcohol polymer herein means the ratio of the vinyl alcohol units after the completion of the hydrolysis reaction to the units capable of being changed to vinyl alcohol units by the hydrolysis reaction.

The intrinsic viscosity of the vinyl alcohol polymer is not particularly limited and selected appropriately in view of the uses of the shaped articles obtained. Judging from its processability, it is preferably in the range between 0.40 and 15.0 dl/g.

Any solvent can be used for dissolving the vinyl alcohol polymer in the present invention as long as it is capable of dissolving the vinyl alcohol polymer and mixing with water in a coagulation bath. Examples of such solvents are dimethyl sulfoxide, dimethylformamide, dimethylacetoamide, ethylene glycol, glycerin, water, hexafluoroisopropanol. These solvents are used singly or as admixture. Aqueous solutions of inorganic salts such as lithium chloride and calcium chloride can also be used singly or as admixtures with the above organic solvents. Among the above, water, dimethyl sulfoxide, a mixed liquid of dimethyl sulfoxide and water, glycerin, ethylene glycol, and the like are preferably used. The concentration of the solution at the time of forming a shaped article is generally 1 to 50 wt % and the temperature at that time is in the range between room temperature and 250° C.

The process for producing a shaped article of the present invention comprises subjecting a solution comprising the above vinyl alcohol polymer to coagulation, extraction or the like by contacting with an aqueous solution containing less than 50 wt % of an organic solvent or with a coagulation liquid comprising water. The contact of the above solution with the coagulation liquid is conducted in one or more coagulation baths or extraction baths.

The coagulation bath used in the present invention is composed of water only or an aqueous solution comprising both an organic solvent capable of coagulating the polyvinyl alcohol polymer and water. The aqueous solution contains an organic solvent in an amount of less than 50 wt %. The upper limit of the content of the organic solvent is appropriately selected depending upon the process of coagulation or extraction employed, and, in case that a plurality of coagulation or extraction baths are used, the upper limit can appropriately be selected for each of coagulation and extraction baths. In case that wet coagulation process such as wet film-formation process, or dry wet cogulation process such as dry wet film-formation is employed, the content of an organic solvent in a coagulation liquid is preferably less than 30 wt %, more preferably less than 10 wt % for the purpose of achieving rapid coagulation by solvent extraction of a vinyl alcohol polymer solution.

Namely, it is preferred that the coagulation bath comprise water only or an aqueous solution containing an organic solvent in an amount as low as possible. In the process for producing shaped articles of the present invention, it is unnecessary that coagulation baths comprise inorganic salts or inorganic bases, and, in view of the heat resistance or coloring, it is preferred that the baths do not contain such inorganic compounds.

The temperature of the coagulation bath used in the process for producing shaped articles of the present invention is not particularly limited and selected appropriately depending upon the uses of the shaped articles obtained, and the range thereof is between room temperature and the boiling point under atmospheric pressure. However, the temperature range can be selected from a wider range of from the melting point of water to room temperature, and even to the temperature above the boiling point under atmospheric pressure where an autoclave is used, for the purpose of controlling the speed of the coagulation caused by extraction of solvent from the solution comprising the vinyl alcohol polymer in case that wet coagulation or dry wet coagulation is employed, or for the purpose of controlling the coagulation speed in case that gel coagulation is employed.

The shaped article obtained by the process of the present invention can be formed into any shape such as film, sheet or the like, which can also be obtained by wet film formation, dry wet film formation or gel film formation, or the like. And further, they can be formed into a shape of ultrathin film or the like, making the best use of the high water resistance of the vinyl alcohol polymer having a high syndiotacticity.

The shaped articles comprising the vinyl alcohol polymer of the present invention may further contain other compounds as long as they do not injure the objects of the present invention. Examples of such compounds are conventional polyvinyl alcohols or other polymers, platicizers such as glycerin, inorganic compounds such as clay, silica and calcium carbonate, and the like. Furthermore, as occasion demands, dyestuffs or pigments for coloring and stabilizers such as antioxidants and ultraviolet absorbers may also be added.

The process for producing shaped articles of the vinyl alcohol polymer of the present invention was completed for the first time by using a vinyl alcohol polymer having a syndiotacticity of not less than 55 mol %. The above process can be applied to production of not only film but also articles having any shape. Furthermore, the process not only affords shaped articles having a higher heat resistance and a higher durability as compared with those obtained by conventional production processes but also realize a reduced production cost and improvement in safety in the process, and is thus of a high industrial value.

Hereinafter the present invention is described in more detail with reference to the following Examples, which are not intended to be limiting thereof. In the Examples, unless otherwise specified, "part(s)" and "%" are "part(s) by weight" and "% by weight", respectively.

SYNTHETIC EXAMPLE 1 OF POLYVINYL ESTER

A Pyrex-glass Kjeldahl flask equipped with a Teflon rotator was charged with 5 ml of vinyl pivalate, 10 ml of distilled water, and 0.5 ml of an emulsifier (an aqueous solution of a sulfonated polyethylene glycol ether represented by

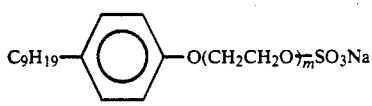

wherein m has a mean value of 18; the content is 65%). The flask, with the mixture, was degassed by repeated freezing and melting, and sealed under a reduced pressure. In a bath of constant temperature at 0° C., the mixture was subjected to polymerization with stirring by irradiation with a 150 W high pressure mercury lamp for 10 hours. After the completion of polymerization, the reaction mixture was poured into a large amount of methanol to recover the obtained polymer. The polymer was then purified by reprecitation using methyl ethyl ketone and water, and dried at 60° C. under a reduced pressure to give a homopolymer of vinyl pivalate. The conversion of monomer to polymer was 55.5%.

SYNTHETIC EXAMPLE 2 OF POLYVINYL ESTER

Synthetic Example 1 was repeated except for using 3 ml of vinyl pivalate and 2 ml of vinyl acetate instead of 5 ml of vinyl pivalate to obtain a copolymer of vinyl pivalate and vinyl acetate. The conversion of monomer to polymer was 65%.

EXAMPLES 1 THROUGH 7

A 300-ml reaction vessel equipped with a dropping funnel, reflux condenser, and inlet tube of nitrogen was charged with 2 g of the homopolymer obtained in Synthetic Example 1 or the copolymer obtained in Synthetic Example 2. To the polymer 200 ml of a hydrolysis solvent was added and the mixture was dissolved to give a solution, which was deoxygenated by bubbling a nitrogen gas having a purity of 99.9%. Separately, an alkali was dissolved or dispersed in methanol to a concentration of 25 wt % and the mixture thus formed was deoxygenated by bubbling a nitrogen gas having a purity of 99.9%. The dissolved oxygen concentration in the polymer solution and that in the mixture of the alkali and methanol thus obtained were measured according to Winkler's method to give a value of not more than $3 \times 10^{-5}$ mole/l, respectively. After the above mixture of the alkali and methanol had been charged in the above-described dropping funnel, the inner temperature of the reaction system was raised to the hydrolysis temperature prescribed in Table 1, and then the polymer solution was subjected to hydrolysis by dropwise addition of the above mixture of the alkali and methanol from the dropping funnel in a nitrogen flow for the time prescribed in Table 1. The reaction was terminated by cooling with ice and neutralized with acetic acid. After the completion of the reaction, the product thus obtained was filtered, washed thoroughly with methanol, and dried at 60° C. under a reduced pressure. The hydrolysis conditions employed and the colors and analytical results of the vinyl alcohol polymers obtained are summarized in Table 1. The 400 MHz $^1$H-NMR spectrum, measured in $d_6$-DMSO using a Model GX-400 NMR spectrometer available from JEOL Ltd., of the vinyl alcohol polymer obtained in Example 1 is shown in FIG. 1.

EXAMPLE 8

The same procedures as in Examples 1 through 7 were followed except that bubbling with nitrogen in the polymer solution and in the mixture of an alkali and methanol was not conducted, that 0.01 g of an antioxidant (IRGANOX 1010 available from Nippon Ciba-Geigyz) was used, and that the atmosphere of hydrolysis was changed to air, to obtain a vinyl alcohol polymer. The hydrolysis conditions employed and the color and analytical results of the vinyl alcohol polymer obtained are shown in Table 1.

COMPARATIVE EXAMPLE 1

The same procedures as in Examples 1 through 7 were followed except that bubbling with nitrogen in the polymer solution and in the mixture of an alkali and methanol was not conducted and that the atmosphere of hydrolysis reaction was changed to air, to obtain a vinyl alcohol polymer. The hydrolysis conditions employed and the color and analytical results of the vinyl alcohol polymer obtained are shown in Table 1. The dissolved oxygen concentration of the polymer solution and that in the mixture of the alkali and methanol were more than $1.6 \times 10^{-3}$ mole/l, respectively.

TABLE 1

| | Hydrolysis conditions | | | | | |
| --- | --- | --- | --- | --- | --- | --- |
| | | | Alkali | | Temperature | Time |
| | Solvent | Polymer*1 | Compound | Molar ratio*2 | (°C.) | (hr) |
| Example 1 | tetrahydrofuran | [A] | KOH | 6.0 | 40 | 0.83 |
| Example 2 | tetrahydrofuran | [A] | KOH | 6.0 | 60 | 0.25 |
| Example 3 | tetrahydrofuran | [A] | NaOH | 6.0 | 60 | 0.5 |
| Example 4 | acetone | [A] | KOH | 6.0 | reflux | 0.17 |
| Example 5 | dioxane | [A] | KOH | 2.0 | 60 | 2.0 |
| Example 6 | tetrahydrofuran | [B] | KOH | 6.0 | 60 | 0.25 |
| Example 7 | tetrahydrofuran | [B] | KOH | 6.0 | 60 | 0.10 |
| Example 8 | acetone | [A] | KOH | 6.0 | 60 | 0.50 |
| Comparative Example 1 | acetone | [A] | KOH | 6.0 | reflux | 72 |

| | Polyvinyl alcohol polymer | | | | |
| --- | --- | --- | --- | --- | --- |
| | | Analytical results | | | |
| | | Composition (mol %)*3 | | $[\eta]$*4 | Syndiotacticity*5 |
| | Color | [1] | [2] | (dl/g) | (mol %) |
| Example 1 | no | 98.8 | 1.2 | 4.13 | 63 |
| Example 2 | no | 98.5 | 1.5 | 3.66 | 63 |
| Example 3 | no | 83.0 | 17.0 | 2.94 | — |
| Example 4 | no | 94.0 | 6.0 | 2.93 | 61 |
| Example 5 | no | 98.7 | 1.3 | 2.85 | 63 |

TABLE 1-continued

| | | | | | |
|---|---|---|---|---|---|
| Example 6 | no | 99.0 | 1.0 | 2.48 | 57 |
| Example 7 | no | 78.0*6 | 20.0*6 | 2.52 | — |
| Example 8 | light gray | 99.0 | 1.0 | 2.90 | 63 |
| Comparative Example 1 | dark brown | 99.0 | 1.0 | 0.59 | — |

(Notes)
*1[A]: the polymer used was the homopolymer of vinyl pivalate obtained in Synthetic Example 1
[B]: the polymer used was the copolymer of vinyl pivalate and vinyl acetate obtained in Synthetic Example 2.
*2Molar ratio represents the molar ratio of an alkali to total vinyl ester units.
*3The composition ratio determined according to the 400 MHz $^1$H-NMR spectrum measured in $d_6$-DMSO using a Model GX-400 available from JEOL Ltd., wherein [1] shows the mol % of vinyl alcohol unit represented by the formula (I) in total constituting monomer units and [2] shows the mol % of vinyl ester unit represented by the formula (II) wherein each of $R^1$, $R^2$ and $R^3$ is methyl group in total constituting units. The NMR spectrum of the vinyl alcohol polymer obtained in Example 1 dissolved in $d_6$-DMSO is shown in FIG. 1.
*4The intrinsic viscosity of a polyvinyl acetate polymer obtained by acetylation measured in benzene at 30° C.
*5The diad syndiotacticity determined according to the 400 MHz $^1$H-NMR spectrum measured in $d_6$-DMSO using a Model GX-400 available from JEOL Ltd.
*6The residual composition other than [1] and [2] (2 mol %) is vinyl acetate unit.

EXAMPLE 9

An autoclave equipped with a stirrer was charged with 90 parts of vinyl pivalate monomer, and deoxygenated with nitrogen by repeated application of pressure and discharge. 0.000277 Part of 2,2-azobis (2,2,4-trimethylpentane) (VR-110 available from Wako Pure Chemical Industries, Ltd.) as initiator was dissolved in 10 parts of vinyl pivalate monomer. After the solution thus obtained had been thoroughly deoxygenated by bubbling with nitrogen, the autoclave with its content was heated. When the inner temperature reached 120° C., the monomer was subjected to polymerization by adding the solution having dissolved the initiator. After 2 hours, the reaction was terminated by cooling, and the content of the autoclave was added to a large amount of methanol to recover the polymer obtained. The polymer was purified twice by reprecipitation using acetone and methanol, and dried at 60° C. under a reduced pressure. The polymer obtained weighted 8.2 parts.

Next, 1 part of the thus-obtained polymer was dissolved in 49 parts of tetrahydrofuran deoxygenated with nitrogen and the solution obtained was maintained at 60° C. To this solution was then added 10.5 parts of a 25% potassium hydroxide solution in methanol which had separately been prepared and deoxygenated with nitrogen, and the resulting mixture was stirred thoroughly. At this time, the dissolved oxygen concentrations of both the polymer solution and the potassium hydroxide solution determined according to Winkler's method were not more than $3 \times 10^{-5}$ mole/l. The solution gelled in 5 minutes after the completion of the addition of a 25% potassium hydroxide solution, and was maintained at 60° C. for additional 25 minutes. Thereafter, the potassium hydroxide was neutralized by adding 3.4 parts of acetic acid and 10.1 parts of methanol. The gel thus formed was pulverized and cleaned with methanol using a Soxhlet extractor to give a vinyl alcohol polymer.

A mixture of 0.1 part of the vinyl alcohol polymer thus obtained, 10 parts of acetic anhydride and 2 parts of pyridine was sealed in a tube, and the vinyl alcohol polymer was acetylated by heating at 120° C. for 3 hours. The polyvinyl acetate obtained was precipitated in n-hexane and purified twice by reprecipitation using acetone and n-hexane.

The NMR spectrum of the thus-obtained polyvinyl alcohol dissolved in $d_6$-DMSO showed that it had a degree of hydrolysis of 99.6 mol %, a syndiotacticity of 60.2 mol %, and a content of 1,2-glycol structure of 2.29 mol %. The polyvinyl acetate obtained above by acetylating the vinyl alcohol polymer had an intrinsic viscosity, measured in benzene at 30° C., of 3.65 dl/g.

EXAMPLE 10

An autoclave equipped with a stirrer was charged with 90 parts of vinyl pivalate monomer and 0.86 part of vinylene carbonate, and was deoxygenated with nitrogen by repeated application of pressure and discharge. 0.00827 Part of 2,2'-azobis-4-methoxy-2,4-dimethylvaleronitrile as initiator was dissolved in 10 parts of vinyl pivalate monomer. The solution thus obtained was thoroughly deoxygenated by bubbling with nitrogen.

The autoclave with its content was heated. When the inner temperature reached 30° C., the monomer was subjected to polymerization by adding the solution with the initiator dissolved therein. After 3 hours, the reaction was terminated by cooling, and the content of the autoclave was poured into a large amount of methanol to recover the polymer obtained. The polymer was purified twice by the reprecipitation using acetone and methanol, and dried at 60° C. under a reduced pressure. The polymer weighed 9.5 parts.

Next, 1 part of the thus-obtained polymer was dissolved in 49 parts of tetrahydrofuran deoxygenated with nitrogen, and the solution obtained was maintained at 60° C. Then, to this solution was added 10.5 parts of a 25% potassium hydroxide solution in methanol which had been prepared and deoxygenated with nitrogen, and the resulting mixture was stirred thoroughly. At this time, the dissolved oxygen concentrations of both the polymer solution and the potassium hydroxide solution determined according to Winkler's method were not more than $3 \times 10^{-5}$ mole/l. The solution gelled in 5 minutes after the completion of the addition of a 25% potassium solution, and was maintained at 60° C. for additional 25 minutes. Thereafter, the potassium hydroxide was neutralized by adding 3.4 parts of acetic acid and 10.1 parts of methanol. The gel thus formed was pulverized and cleaned with methanol using a Soxhlet extractor to give a vinyl alcohol polymer.

A mixture of 0.1 part of the vinyl alcohol polymer thus obtained, 10 parts of acetic anhydride, and 2 parts of pyridine was sealed in a tube, and the vinyl alcohol polymer was acetylated by heating at 120° C. for 10 hours. The polyvinyl acetate obtained was precipitated in n-hexane and purified twice by reprecipitation using acetone and n-hexane.

The NMR spectrum of the thus-obtained vinyl alcohol polymer dissolved in $d_6$-DMSO showed that it had a degree of hydrolysis of 99.6 mol %, a syndiotacticity of 60.2 mol %, and a content of 1,2-glycol structure of 2.5 mol %. The polyvinyl acetate obtained above by acetylating the vinyl alcohol had an intrinsic viscosity, measured in benzene at 30° C., of 4.15 dl/g.

The vinyl alcohol polymers heretofore obtained in Examples 1, 9, and 10 were evaluated for their solubilities in water and DMSO. The results are summarized in Table 2.

TABLE 2

|  | Water | | DMSO | |
|---|---|---|---|---|
|  | 90° C. | 110° C. | 25° C. | 80° C. |
| Polyvinyl alcohol in Example 9 | X-Δ (4 hours) | ○ (4 hours) | ○ (12 hours) | ○ (6 hours) |
| Polyvinyl alcohol in Example 10 | X-Δ (4 hours) | ○ (4 hours) | ○ (12 hours) | ○ (6 hours) |
| Polyvinyl alcohol in Example 1 | X (4 hours) | Δ (4 hours) | X (3 days) | ○ (3 days) |

Solubility ratings: ○: soluble, Δ: partly soluble, X: insoluble

EXAMPLES 11 THROUGH 13

A reaction vessel equipped with a stirrer was charged with 600 parts of vinyl pivalate monomer and 200 parts of methanol, and was deoxygenated by bubbling with nitrogen. 0.0712 Part of 2,2'-azobisisobutyronitrile as initiator was dissolved in 26 parts of methanol, and the resulting solution was thoroughly deoxygenated by bubbling with nitrogen. The reaction vessel with its content was heated. When the inner temperature reached 60° C., the monomer was subjected to polymerization by adding the solution with the initiator dissolved therein. After 190 minutes, when the conversion of monomer to polymer reached 50%, the reaction was terminated by cooling, and then the unreacted vinyl pivalate monomer was removed under a reduced pressure, while sometimes t-butanol was being added to obtain a solution of polyvinyl pivalate in t-butanol. The butanol was removed under a reduced pressure to obtain a polyvinyl pivalate.

Next, a reaction vessel equipped with a stirrer and a reflux condenser was charged with 10 parts of polyvinyl pivalate thus obtained, and the inner space of the reaction vessel was replaced with nitrogen by repeated degassing under a reduced pressure and charge with nitrogen. Thereafter, to this reaction vessel was added 90 parts of a solvent for hydrolysis reaction as shown in Table 3, which had been deoxygenated by bubbling with nitrogen, and the resulting mixture was heated with stirring to 60° C. to give a solution. To this solution was then added 21 parts of a solution of 25% potassium hydroxide in methanol which had been prepared and deoxygenated with nitrogen, and the resulting mixture was thoroughly mixed with stirring. At this time, the dissolved oxygen concentrations of both the polymer solution and the potassium hydroxide solution determined according to Winkler's method were not more than $3 \times 10^{-5}$ mole/l. The reaction vessel was maintained at 60° C. in a nitrogen atmosphere for 2 hours, and then neutralized by adding 6.8 parts of acetic acid and 20 parts of methanol. The gel thus formed was pulverized and cleaned with methanol using a Soxhlet extractor to give a vinyl alcohol polymer. A mixture of 0.5 part of the polyvinyl alcohol thus obtained, 10 parts of acetic anhydride, and 2 parts of pyridine was sealed in a tube, and the vinyl alcohol polymer was acetylated by heating at 120° C. for 8 hours. The polyvinyl acetate obtained was precipitated in n-hexane and purified twice by reprecipitation using acetone and n-hexane.

The NMR spectrum of the thus-obtained polyvinyl alcohol dissolved in $d_6$-DMSO was measured to obtain the degree of hydrolysis, syndiotacticity, and content of 1,2-glycol structure. The polyvinyl acetate obtained above by the reacetylation was measured for the intrinsic viscosity in benzene at 30° C. The syndiotacticity and the content of 1,2-glycol structure were 61.4 mol % and 1.70 mol %, respectively. The results are shown in Table 3.

TABLE 3

| Example | Hydrolysis solvent | Degree of hydrolysis (mol %) | Intrinsic viscosity (dl/g) |
|---|---|---|---|
| 1 | methyl ethyl ketone | 99.1 | 1.10 |
| 2 | tetrahydrofuran | 98.9 | 1.08 |
| 3 | t-butanol | 92.6 | 1.12 |

EXAMPLE 14

A reaction vessel equipped with a stirrer and reflux condenser was charged with 10 parts of the polyvinyl pivalate synthesized in Example 11, and the inner space of the reaction vessel was deoxygenated with nitrogen by repeated degassing under a reduced pressure and charged with nitrogen. Thereafter, to this reaction vessel was added 90 parts of methyl ethyl ketone which had been deoxygenated with nitrogen, and the resulting mixture was heated with stirring to 60° C. to give a solution. To this solution was added 16.1 parts of a 1.1% sodium methylate in methanol which had been prepared and deoxygenated with nitrogen, and the resulting mixture was thoroughly mixed with stirring. At this time, the dissolved oxygen concentrations of both the polymer solution and the sodium methylate solution determined according to Winkler's method were not more than $3 \times 10^{-5}$ mole/l. The reaction vessel was maintained at 60° C. in a nitrogen atmosphere for 80 minutes, and then neutralized by adding 0.25 part of acetic acid and 20 parts of methanol. The gel thus formed was pulverized and cleaned with methanol using a Soxhlet extractor to give a vinyl alcohol polymer.

The NMR spectrum of the thus-obtained polyvinyl alcohol dissolved in a mixed solvent comprising $d_6$-DMSO and $CDCl_3$ showed that it had a degree of hydrolysis of 30.1 mol %.

EXAMPLE 15

An autoclave equipped with a stirrer was charged with 90 parts of polyvinyl pivalate monomer, and was deoxygenated with nitrogen by repeated application of pressure and discharge. 0.00125 Part of 2,2'-azobisisobutyronitrile as initiator was dissolved in 10 parts of vinyl pivalate monomer. The solution thus obtained was thoroughly deoxygenated by bubbling with nitrogen.

The autoclave with its content was heated. When the inner temperature reached 60° C., the monomer was subjected to polymerization by adding the solution with the initiator dissolved therein. After 90 minutes, the reaction was terminated by cooling, and the content of the autoclave was poured into a large amount of methanol to recover the polymer obtained. The polymer was purified twice by the reprecipitation using acetone and methanol, and dried at 60° C. under a reduced pressure. The polymer obtained was 6.5 parts.

Next, 1 part of the thus-obtained polymer was dissolved in 49 parts of tetrahydrofuran deoxygenated with nitrogen, and the solution obtained was maintained at 60° C. And then, to this solution was added 10.5 parts of a 25% potassium hydroxide solution in methanol which had been prepared and deoxygenated with nitrogen, and the resulting mixture was stirred thoroughly. At this time, the dissolved oxygen concentrations of both the polymer solution and the potassium hydroxide solution determined according to Winkler's method were not more than $3 \times 10^{-5}$ mole/l. The hydrolysis solution gelled in about 5 minutes after the completion of the addition of a 25% potassium hydroxide solution, and was maintained at 60° C. for additional 25 minutes. Thereafter, the potassium hydroxide was neutralized by adding 3.4 parts of acetic acid and 10.1 parts of methanol. The gel thus formed was pulverized and cleaned with methanol using a Soxhlet extractor to give a vinyl alcohol polymer. A mixture of 0.1 part of the vinyl alcohol polymer thus obtained, 10 parts of acetic anhydride, and 2 parts of pyridine was sealed in a tube, and the vinyl alcohol polymer was acetylated by heating at 120° C. for 3 hours. The polyvinyl acetate was precipitated in n-hexane and purified twice by the reprecipitation using acetone and n-hexane.

The NMR spectrum of the thus-obtained vinyl alcohol polymer dissolved in $d_6$-DMSO showed that it had a degree of hydrolysis of 99.7 mol %, a syndiotacticity of 61.5 mol %, and a content of 1,2-glycol structure of 1.70 mol %. The polyvinyl acetate obtained above by acetylating the vinyl alcohol polymer had an intrinsic viscosity, measured in benzene at 30° C., of 6.80 dl/g.

EXAMPLE 16

A reaction vessel equipped with a stirrer was charged with 100 parts of vinyl pivalate monomer and 0.00827 part of 2,2'-azobisisobutyronitrile, and was deoxygenated by bubbling with nitrogen. Thereafter, the resulting mixture was immediately cooled until the inner temperature of the reaction vessel reached $-30°$ C., and then subjected to polymerization with stirring by irradiation from a distance of 15 cm using a Model UM452 high pressure mercury lamp having a rated demand of 450 W available from Ushio Inc. After 70 minutes, the irradiation was terminated, and the content of the reaction vessel was poured into a large amount of methanol to recover the polymer obtained. The polymer was purified twice by the reprecipitation using acetone and methanol, and dried at 60° C. under a reduced pressure. The polymer obtained weighed 5.4 parts.

Next, 1 part of the thus-obtained polymer was dissolved in 49 parts of methyl ethyl ketone deoxygenated with nitrogen, and the solution obtained was maintained at 60° C. And then, to this solution was added 10.5 parts of a 25% methanol solution of potassium hydroxide which had been prepared and deoxygenated with nitrogen, and the resulting mixture was stirred thoroughly. At this time, the dissolved oxygen concentrations of both the polymer solution and the potassium hydroxide solution determined according to Winkler's method were not more than $3 \times 10^{-5}$ mole/l. The solution gelled in about 5 minutes after the completion of the addition of a 25% potassium hydroxide solution, and was maintained at 60° C. for additional 25 minutes. Thereafter, the potassium hydroxide was neutralized by adding 3.4 parts of acetic acid and 10.1 parts of methanol. The gel thus formed was pulverized and cleaned with ethanol using a Soxhlet extractor to give a vinyl alcohol polymer. A mixture of 0.1 part of the vinyl alcohol polymer thus obtained, 10 parts of acetic anhydride, and 2 parts of pyridine was sealed in a tube, and the vinyl alcohol polymer was acetylated by heating at 120° C. for 3 hours. The polyvinyl acetate obtained was precipitated in n-hexane and purified twice by reprecipitation using acetone and n-hexane. The NMR spectrum of the thus-obtained vinyl alcohol polymer dissolved in $d_6$-DMSO showed that it had a degree of hydrolysis of 99.6 mol %, a syndiotacticity of 64.0 mol %, and a content of 1,2-glycol structure of 0.80 mol %. The polyvinyl acetate obtained above by acetylating the vinyl alcohol polymer had an intrinsic viscosity, measured in benzene at 30° C., of 2.95 dl/g.

EXAMPLE 17

An autoclave equipped with a stirrer was charged with 90 parts of vinyl pivalate monomer, and was deoxygenated with nitrogen by repeated application of pressure and discharge. 0.000091 Part of 2,2'-azobis(4-methoxy-2,4-dimethylvaleronitrile) as initiator was dissolved in 10 parts of vinyl pivalate monomer. The solution thus obtained was thoroughly deoxygenated by bubbling with nitrogen.

The autoclave with its content was heated. When the inner temperature reached 30° C., the monomer was subjected to polymerization by adding the solution with the initiator dissolved therein. After 10 hours, the reaction was terminated by cooling, and the content of the autoclave was poured into a large amount of methanol to recover the polymer obtained. The polymer was purified twice by the reprecipitation using acetone and methanol, and dried at 60° C. under a reduced pressure. The polymer obtained weighed 4.2 parts.

Next, 1 part of the thus-obtained polymer was dissolved in 49 parts of tetrahydrofuran deoxygenated with nitrogen, and the solution obtained was maintained at 60° C. And then, to this solution was added 10.5 parts of a 25% potassium hydroxide solution in methanol which had been prepared and deoxygenated with nitrogen, and the resulting mixture was stirred thoroughly. At this time, the dissolved oxygen concentrations of both the polymer solution and the potassium hydroxide solution determined according to Winkler's method were not more than $3 \times 10^{-5}$ mole/l. The solution gelled after about 5 minutes, and was maintained at 60° C. for additional 25 minutes. Thereafter, the potassium hydroxide was neutralized by adding 3.4 parts of acetic acid and 10.1 parts of methanol. The gel thus formed was pulverized and cleaned with methanol using a Soxhlet extractor to give a vinyl alcohol polymer. A mixture of 0.05 part of the vinyl alcohol polymer thus obtained, 10 parts of acetic anhydride, and 2 parts of pyridine was sealed in a tube, and the vinyl alcohol polymer was acetylated by heating at 120° C. for 3 hours. The polyvinyl acetate was precipitated in n-hexane and purified twice by reprecipitation using acetone and n-hexane.

The NMR spectrum of the thus-obtained vinyl alcohol polymer dissolved in $d_6$-DMSO showed that it had a degree of hydrolysis of 99.7 mol %, a syndiotacticity of 61.5 mol %, and a content of 1,2-glycol structure of 1.42 mol %. The polyvinyl acetate obtained above by reacetylating the vinyl alcohol polymer had an intrinsic viscosity, measured in benzene at 30° C., of 9.72 dl/g.

EXAMPLE 18

The vinyl alcohol polymer obtained in Example 11 was dissolved in dimethyl sulfoxide to give a 7 wt % solution, and the resulting solution was spread over a polyethylene terephthalate film and then immersed into a methanol bath to give a film. The film obtained was rinsed thoroughly with methanol, air-dried, and then heat-treated at 160° C. for 10 minutes to give a film having a thickness of 100 μm. The film thus obtained was immersed in boiling water for an hour, then it maintained the shape of film, somewhat swelled though.

COMPARATIVE EXAMPLE 2

A polyvinyl alcohol having obtained by hydrolyzing a polyvinyl acetate and having a degree of hydrolysis of 99.9 mol % and a syndiotacticity of 52.8 mol % and the reacetylated product of which had an intrinsic viscosity of 0.89 dl/g was formed in the same manner in Example 18 into a film having a thickness of 100 μm. The film obtained perfectly dissolved in boiling water. As a result, it became clear that the film comprising the vinyl alcohol polymer of the present invention has an excellent water resistance.

EXAMPLE 19

The vinyl alcohol polymer obtained in Example 11 was dissolved in a mixed solvent of DMSO and water prepared in a weight ratio of 80/20 to give 5 wt % and 2 wt % solutions. These solutions were allowed to stand at −10° C. for 3 hours to give two gels. And immediately thereafter, the gels were transferred to a bath to measure their melting temperatures. The melting temperature was measured by putting a steel ball having a weight of 1.06 g on the upper part of a specimen gel placed in a test tube having an inner diameter of 12.8 mm, heating it at a rate of 0.4° to 0.5° C./min and observing the temperature where the whole part ball sank in the gel. The results are shown in Table 4.

COMPARATIVE EXAMPLE 3

Example 19 was repeated except for using a polyvinyl alcohol having an intrinsic viscosity of 1.11 dl/g, a degree of hydrolysis of 99.5 mol % and a syndiotacticity of 53 mol % to obtain a gel and measure the melting temperature thereof. The results are summarized in Table 4.

TABLE 4

| | Concentration of polyvinyl alcohol (wt %) | 5 | 2 |
|---|---|---|---|
| Example 19 | Melting temperature (°C.) | 86 | 72 |
| Comparative Example 3 | Melting temperature (°C.) | 62 | <20 |

As is apparent from the above results, the gel of the present invention has a higher melting temperature and is more excellent in heat resistance than conventional polyvinyl alcohol gels. Furthermore, the gel of the present invention is capable of producing a high-solvent-content gel, which is one of the characteristics of the present invention.

EXAMPLE 20

The vinyl alcohol polymer obtained in Example 11 was dissolved in 95 parts of dimethyl sulfoxide to give a solution, and the resulting solution was cast at a temperature of 80° C. over a polyethylene terephthalate film using a bar coater with a spacer having a thickness of 1.0 mm. The film-like shaped article obtained was immersed in sufficient amount of water to coagulate therein for about 30 minutes at room temperature, and the coagulated film was dried for about 60 minutes in a hot circulating air at 40° C., to give a polyvinyl alcohol film.

The film obtained did not show any change such as discoloring even when the film was allowed to stand in a drying oven at 90° C. for 100 hours, and was thus of excellent heat resistance and durability.

COMPARATIVE EXAMPLE 4

Example 20 was repeated except for using a coagulation liquid comprising 300 parts of sodium sulfate and 700 parts of water instead of distilled water to obtain a polyvinyl alcohol film.

The film thus obtained was allowed to stand in a drying oven at 90° C. for 100 hours, and as a result it discolored to brown and thus was of inferior heat resistance and durability.

COMPARATIVE EXAMPLE 5

Example 20 was repeated except for using a polyvinyl alcohol obtained by hydrolyzing a polyvinyl acetate and having a degree of hydrolysis of 99.9 mol %, a syndiotacticity of 52.8 mol % and an intrinsic viscosity of 0.89 dl/g. Film formation was attempted using the polyvinyl alcohol thus obtained, but the polyvinyl alcohol did not coagulate and remained dissolved.

Obviously, numerous modifications and variations of the present invention are possible in the light of the above disclosures. It is therefore to be understood that within the scope of the appended claims, the invention may be practiced otherwise than as specifically described herein.

What is claimed is:

1. A vinyl alcohol polymer containing the constituent unit (I) and the constituent unit (II) represented by the following formulae, having a content of the constituent unit (I) of 10 to 99.99 mol % and a content of the constituent unit (II) of 90 to 0.01 mol %, a diad syndiotacticity of not less than 55 mol % and an intrinsic viscosity of polyvinyl acetate obtained by acetylation of not less than 0.7 dl/g, which is measured in benzene at 30° C.

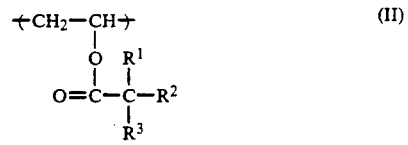

wherein $R_1$ is a hydrogen atom or a hydrocarbon group, and each of $R_2$ and $R_3$ is a hydrocarbon group.

2. A vinyl alcohol polymer according to claim 1 wherein the content of the constituent unit (I) is 55 to 99.99 mol % and the content of the constituent unit (II) is 45 to 0.01 mol %.

3. A vinyl alcohol polymer according to claim 2 wherein the content of the constituent unit (I) is 70 to 99.5 mol % and the content of the constituent unit (II) is 30 to 0.50 mol %.

4. A vinyl alcohol polymer according to claim 1 wherein the content of the constituent unit (I) is 10 to 55 mol % and the content of the constituent unit (II) is 90 to 45 mol %.

5. A vinyl alcohol polymer according to claim 1 wherein said constituent unit (II) is vinyl pivalate unit.

* * * * *